(12) United States Patent
Bergery

(10) Patent No.: US 8,867,308 B2
(45) Date of Patent: Oct. 21, 2014

(54) SYSTEM, METHOD AND COMPUTER PROGRAM PRODUCT FOR STACKING SEISMIC NOISE DATA TO ANALYZE SEISMIC EVENTS

(75) Inventor: Guillaume B. Bergery, Pertuis (FR)

(73) Assignee: Magnitude SPAS (FR)

( * ) Notice: Subject to any disclaimer, the term of this patent is extended or adjusted under 35 U.S.C. 154(b) by 1095 days.

(21) Appl. No.: 11/935,835

(22) Filed: Nov. 6, 2007

(65) Prior Publication Data

US 2008/0106974 A1 May 8, 2008

Related U.S. Application Data

(60) Provisional application No. 60/864,474, filed on Nov. 6, 2006.

(51) Int. Cl.
*G01V 1/30* (2006.01)
*G01V 1/28* (2006.01)
*G01V 1/36* (2006.01)

(52) U.S. Cl.
CPC .......... *G01V 1/362* (2013.01); *G01V 2210/322* (2013.01)
USPC .............................................. 367/73; 367/38

(58) Field of Classification Search
USPC ...................................................... 367/73, 38
See application file for complete search history.

(56) References Cited

U.S. PATENT DOCUMENTS

| 4,594,691 | A |   | 6/1986 | Kimball et al. |
|-----------|---|---|--------|----------------|
| 4,964,098 | A | * | 10/1990 | Hornbostel ..................... 367/73 |
| 5,596,548 | A | * | 1/1997 | Krebs ............................. 367/56 |
| 6,021,379 | A | * | 2/2000 | Duren et al. ..................... 702/16 |
| 7,663,970 | B2 | * | 2/2010 | Duncan et al. .................. 367/38 |
| 2005/0259516 | A1 |  | 11/2005 | Ray et al. |

FOREIGN PATENT DOCUMENTS

FR    2795181    6/2000

OTHER PUBLICATIONS

Maxwell et al., "The role of passive microseism monitoring in the instrumented oil field," The Leading Edge, Jun. 2001, pp. 636-639.*
International Search Report for International PCT/IB2007/004539. Mailed Dec. 10, 2008.
Written Opinion of the International Searching Authority for International PCT/IB2007/004539. Mailed Dec. 10, 2008.
Detlef Hohl, "Passive Seismic Reflectivity Imaging with Ocean-Bottom Cable Data" SEG/New Orleans 2006 Annual Meeting. 1560-1564.
Canadian Intellectual Property Office Office Action dated Jan. 14, 2013 for Application No. 2,671,189.

* cited by examiner

*Primary Examiner* — Ian J Lobo
(74) *Attorney, Agent, or Firm* — Cantor Colburn LLP

(57) ABSTRACT

Disclosed is a method for determining seismic event data from indications of seismic noise, the method including receiving seismic trace data from a plurality of locations, and providing a virtual trace value ($E_{Rvirtual}$) as seismic event data for a virtual trace location from the seismic trace data. A system and computer program product for determining seismic event data is also disclosed.

10 Claims, 3 Drawing Sheets

SYSTEM, METHOD AND COMPUTER PROGRAM PRODUCT FOR STACKING SEISMIC NOISE DATA TO ANALYZE SEISMIC EVENTS

CROSS REFERENCE TO RELATED APPLICATIONS

Under 35 U.S.C. §119(e), this application claims the benefit of U.S. Provisional Application No. 60/864,474, filed Nov. 6, 2006, the entire disclosure of which is incorporated herein by reference.

BACKGROUND OF THE INVENTION

1. Field of the Invention

The teachings herein relate to seismic tools used in subterranean exploration, an in particular, to techniques for minimizing noise and providing for detection of microseismic events.

2. Background of the Related Art

Subterranean formations may be monitored using one or more seismic receivers. The receivers may be geophones placed at the surface or submerged in wells or on the ocean floor. Also, the receivers may be hydrophones placed in those same locations, but sensitive to only certain types of waves. The receivers placed in wells may be shallow (usually above the formation of interest) or deep (at or below the formation of interest). Seismic receivers may be sensitive to seismic waves along a certain axis or those traveling on any axis. Likewise, the receivers may be sensitive to only certain types of seismic waves, or to several types. Those sensitive to certain axes of travel, called directional receivers, may be coupled with other directional receivers, for example, in a set of three orthogonal receivers which collect information about the waves in three dimensions. This three-dimensional information may be rotated mathematically through the use of trigonometric functions in order to derive information as to wave travel in the x-axis, y-axis, and z-axis relative to gravity. Alternatively, mathematical rotation may provide translation of the data relative to a wellbore, a cardinal direction, or any other reference point.

Microseismic monitoring concerns passively monitoring a formation for seismic events which are very small. Such events may include the seismic effects generated in a formation by fracturing, depletion, flooding, treatment, fault movement, collapse, water breakthrough, compaction or other similar subterranean interventions or effects. One of the main problems with microseismic monitoring, as with other forms of seismic monitoring, is that of noise. With microseismic events, however, the problem is emphasized because the signal strength is generally very small. This means, in turn, that a small amount of noise which would not cause any significant effect as to a regular, active seismic survey causes a significant degradation of the signal to noise ratio in the microseismic survey.

Microseismic surveys include tasks such as receiving data from a receiver, locating data which exceeds some threshold, and analyzing those over-threshold data in order to determine information about certain events. Data which does not meet the threshold may be considered noise data, and may be discarded or simply not recorded.

Microseismic data may be analyzed as a set, with several receivers providing data for a joint analysis. Data is collected from a receiver and related to the other data collected from other receivers in order to derive additional information about the formation. Information from three receivers, for example, may be triangulated in order to estimate the location of a seismic event.

What are needed are a method and a system to make use of seismic data, such as microseismic data previously thought to contain only noise data, in order to derive information about events.

SUMMARY OF THE INVENTION

Disclosed is a method for determining seismic event data from indications of seismic noise, the method including receiving seismic trace data from a plurality of locations, and providing a virtual trace value ($E_{Rvirtual}$) as seismic event data for a virtual trace location from the seismic trace data.

Also disclosed is a system for determining seismic event data from indications of seismic noise, the system including a plurality of seismic receivers for providing seismic trace data, at least two of the plurality of seismic receivers arranged to provide for a virtual trace location, and at least one processor adapted for receiving the seismic trace data from the at least two seismic receivers as input information and for performing a method comprising providing a virtual trace value ($E_{Rvirtual}$) as seismic event data for the virtual trace location.

Further disclosed is a computer program product including machine readable instructions stored on machine readable media. The instructions are for determining seismic event data by implementing a method including receiving seismic trace data from a plurality of locations, and providing a virtual trace value ($E_{Rvirtual}$) as seismic event data for a virtual trace location from the seismic trace data.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Subterranean formations are of interest for a variety of reasons. Such formations may be used for the production of hydrocarbons, the storage of hydrocarbons or other substances, mining operations or a variety of other uses. One method used to obtain information regarding subterranean formations is to use acoustic or seismic waves to interrogate the formation. Seismic waves may be generated into the formation and the resulting reflected waves received and analyzed in order to provide information about the geology of the formation. Such interrogations are referred to as active seismic surveys.

Microseismic monitoring concerns passively monitoring a formation for seismic events which are very small. In passive monitoring, the formation is not interrogated, per se, but seismic receivers are placed to receive directly any seismic waves generated by events occurring within the formation. Such events may include the seismic effects generated in a formation by fracturing, depletion, flooding, treatment, fault movement, collapse, water breakthrough, compaction or other similar subterranean interventions or effects. This additional information about these events may be very useful in determining certain interventions in order to enhance the use of the formation or provide additional safety measures in certain situations. For example, it is common in the hydrocarbon production industry to fracture or "frac" a formation. During this operation, fluid and propant is pumped down a well at high pressure in order to generate additional fracturing within a zone of the well. The propant is pumped into these fractures and maintains them after the pressure is removed. Monitoring the seismic waves generated during and immediately after a frac operation can provide critical information about the operation, such as the direction and extent of the fractures being generated.

In yet another exemplary application, microseismic monitoring may be used to provide long-term monitoring for subterranean storage facilities and formations from which hydrocarbons or water is being produced. Under certain conditions, the integrity of these formations may become compromised, causing collapse. Such collapses may pose a safety concern for those on the surface, as entire sections of ground may fall into the collapse. However, often certain characteristic small seismic waves may precede such failures, permitting remedial measures to delay the collapse and ultimately warn of the impending collapse to allow for isolation of any dangerous areas from personnel.

Figure 1:
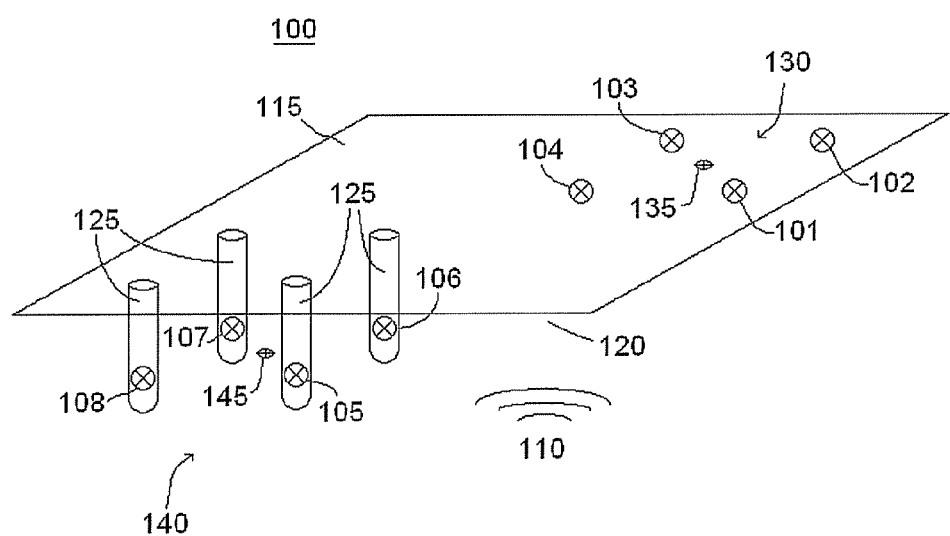
FIG. 1 illustrates a system for seismic monitoring.

Referring to FIG. 1, there are shown aspects of an exemplary embodiment of a system for seismic monitoring 100. In one embodiment, one or more subterranean formations are monitored using one or more seismic receivers 101-108. Each receiver 101-108 receives seismic waves 110 generated by seismic activity and generates seismic trace data representing the waves 110 and indicative of the seismic activity. In this embodiment, seismic receivers are passive seismic receivers. Each receiver 101-108 may be a geophone (as shown in FIG. 1) and/or a hydrophone submerged in wells or on the ocean floor. Each receiver 101-108 may be an analog or digital receiver. Other types of seismic receivers known now or in the future may also be used. As shown in FIG. 1, the receivers 101-108 may be placed in a location on a surface 115 of the earth 120 surrounding the formations, and may also be disposed in a location within one or more wellbores 125 that have been drilled into the earth 120 and may extend into and/or through the formations. In the present embodiment, receivers 101, 102, 103 and 104 are placed on the surface 115, and receivers 105, 106, 107 and 108 are submerged in the wellbores 125. The number and position of the receivers 101-108 are merely exemplary. Any number or configuration of receivers may be used, at various desired depths.

The receivers 101-108 may be placed in shallow wells (usually above the formation of interest), deep wells (for example, at or below the formation of interest) or at the surface 115. The receivers 101-108 may be sensitive to seismic waves 110 along a certain axis or those traveling on any axis. Likewise, the receivers 101-108 may be sensitive to only certain types of seismic waves, or several types. Those receivers 101-108 sensitive to certain axes of travel, called directional receivers 101-108, may be coupled with other directional receivers 101-108. For example, multiple directional receivers 101-108 may be coupled together in a set of three orthogonal receivers which collect information about the waves 110 in three dimensions. This three-dimensional information may be rotated mathematically through the use of trigonometric functions in order to derive information as to wave travel in the x-axis, y-axis, and z-axis relative to gravity. Alternatively, mathematical rotation may provide translation of the data relative to the wellbore 125, a cardinal direction, or any other reference point.

In one embodiment, the receivers 101-108 may be represented as one or more pluralities of receivers. For example, the receivers 101, 102, 103 and 104 may represent a first plurality 130, and the receivers 105, 106, 107 and 108 may represent a second plurality 140. In one embodiment, the receivers 101-104 of the first plurality 130 are arranged to provide for a first virtual trace location 135, and the receivers 105-108 of the second plurality 140 are arranged to provide for a second virtual trace location 145.

Any number of receivers 101-108 may be provided. In one embodiment, a relatively dense array of receivers is provided, which may be positioned relative to geologic areas thought to originate seismic events or other seismic activity sources of interest.

Figure 2:
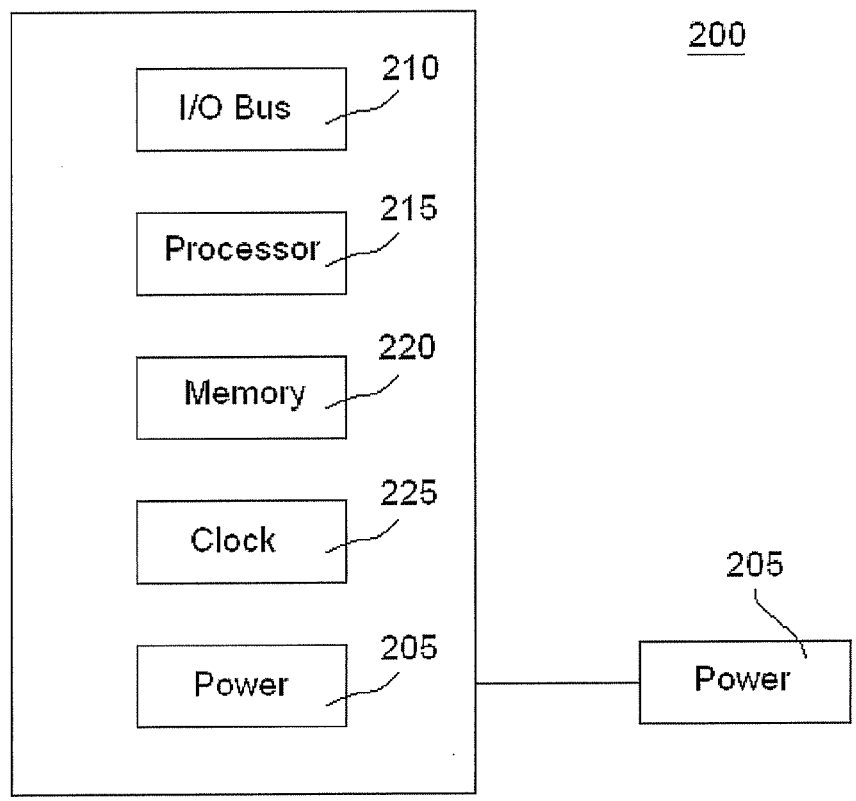
FIG. 2 illustrates an embodiment of a processing unit for processing data indicative of seismic activity.

Referring to FIG. 2, each receiver 101-108 may be coupled to a processing unit 200 such as a computer (or data from receivers 101-108 may be provided to a computer) for analysis. The processing unit 200 may include, without limitation, at least one power supply 205, an input/output bus 210, a processor 215, a memory device or system 220, a clock 225 or other time measurement device, and other components (not shown) such as an input device and an output device. The power supply 205 may be incorporated in a housing along with other components of the processing unit 200, or may be connected remotely such as by a wired connection. Other components may be included as deemed suitable.

Generally, the processing unit 200 receives trace data from one or more of the receivers 101-108 and processes the trace data, such as by the methods described herein. Each receiver 101-108 may be coupled in communication with the processing unit 200 by a direct connection, such as a wired connection. In one embodiment, one or more components of the processing unit 200 may be incorporated with one or more of the receivers 101-108 in a common housing, and/or may be positioned with or near one or more of the receivers 101-108. In another embodiment, each receiver 101-108 may be coupled in communication with the processing unit 200 via a wireless connection. The wireless connection may be provided for by an antenna (and other suited wireless equipment) for generation of a wireless communications signal. The illustrations of FIGS. 1 and 2 are non-limiting and merely exemplary of one embodiment of the network 100.

The seismic waves of interest for microseismic monitoring are generally of very small amplitude. Accordingly, a small amount of noise may cause a significant degradation of the signal to noise ratio in a microseismic survey. It has been discovered, however, that analyzing several sets of waves 110 which have a very poor signal to noise ratio yields useful information and may lead to the detection of events which were previously undetectable as being below threshold values for detection.

There is provided a system and method for analyzing seismic data, such as microseismic data, that incorporates seismic trace data from a plurality of seismic receivers 101-108, and detects microseismic events. The microseismic trace data may be analyzed as a set, with several of the receivers 101-108 providing trace data for a joint analysis. Trace data is collected from a plurality of the receivers 101-108 and computed to form a single virtual point. The virtual point may then be examined in order to determine if there has been a microseismic event. The results from several virtual points may be triangulated in order to determine the location of the event. Although the systems and methods described herein are described in conjunction with microseismic monitoring, the systems and methods may also be used for active monitoring and/or other types of passive monitoring.

The virtual points may be computed to focus on seismic events and other seismic activities, such as underground permanent or pseudo-permanent sources of noise and/or microseismic events. For example, calculation of the virtual points may be performed to identify and locate underground active zones, such as a steam chamber in heavy oil sand.

Figure 3:
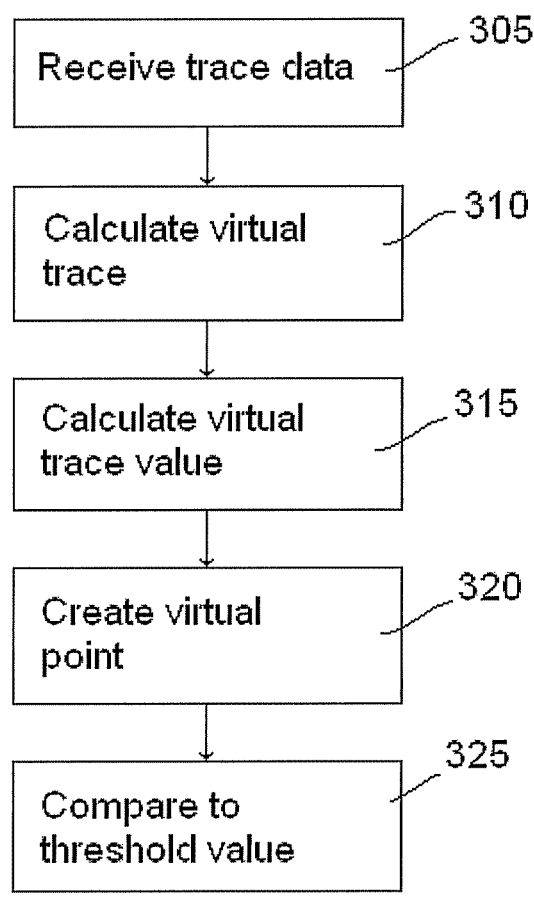
FIG. 3 is a flowchart illustrating exemplary aspects of a method for monitoring seismic events.

FIG. 3 illustrates a method 300 for monitoring seismic events, which may be utilized in, but is not limited to, microseismic passive monitoring. The method 300 includes one or more stages 305, 310, 315, 320 and 325. The method 300 is described herein in conjunction with the plurality 130 of receivers 101-104, although the method may be performed in conjunction with any number and configuration of receivers.

In the first stage 305, a stream of trace data from each of a plurality of the receivers 101-104 is received, such as by processor 215. Trace data may include data regarding seismic events and data that is considered noise. Each stream of trace data includes a plurality of data points generated by a respective receiver 101-104 during a selected duration of time or time window. The plurality of data points from a single receiver 101-104 over the selected duration of time is referred to as a "trace". These data points may also be referred to as a "trace data stream".

In one embodiment, the plurality of receivers used to generate a virtual point includes each of the receivers 101-104, and thus includes four (4) receivers. However, the plurality of receivers may be two receivers, three receivers, or any number and any combination of the receivers 101-108. Furthermore, when multiple virtual points are calculated from multiple pluralities of receivers 101-108, the individual receivers in each plurality may be selected from any number of receivers 101-108, and may include receivers that are selected for other pluralities, i.e., multiple pluralities may share common receivers.

In one embodiment, the trace data in each trace may be processed using methods that include statistical analysis, data fitting, and data modeling. Examples of statistical analysis include calculation of a summation, an average, a variance, a standard deviation, t-distribution, a confidence interval, and others. Examples of data fitting include various regression methods, such as linear regression, least squares, segmented regression, hierarchal linear modeling, and others. Examples of data modeling include direct seismic modeling, indirect seismic modeling, and others.

The naming and numbering convention described herein is provided to illustrate the method 300 described herein. The naming and number convention provided is arbitrarily chosen, and is provided for explanation only.

"Trace$_m$(t)" corresponds to each of a plurality of data points in a specific trace received from a receiver 101-104 at a particular location. "Rn" corresponds to a specific receiver number in the plurality of receivers, at a given location at the surface or downhole in a wellbore, such as wellbore 125. For example, receivers 101, 102, 103 and 104 may correspond to R1, R2, R3 and R4, respectively. "E$_{Rn}$(t)" corresponds to a resultant trace calculated from at least one trace$_m$(t) received from a receiver having a corresponding receiver number. "E$_{Rvirtual}$(t)" corresponds to a virtual trace calculated from the plurality of receivers 101-104, and "E$_{Rvirtual}$" corresponds to a virtual trace value calculated based on the virtual trace (E$_{Rvirtual}$(t)).

In the first stage 305, traces (trace$_m$(t)) are received from each of the receivers 101-104. The traces (trace$_m$(t)) may be processed to produce a single trace (E$_{Rn}$(t)) for the location of each receiver 101-104.

The resultant trace (E$_{Rn}$(t)) may be computed from a single trace, in the event that a receiver location includes a single receiver (or sensor). In the event that a receiver location includes multiple receivers or sensors, the traces (trace$_m$(t)) from each receiver or sensor are summed together to form the single resultant trace (E$_{Rn}$(t)). In one embodiment, for a receiver location that generates only one trace, the trace (trace$_m$(t)) may be equivalent to the resultant trace (E$_{Rn}$(t)).

In one embodiment, the resultant trace (trace$_{Rn}$(t)) may be calculated using the following equation:

$$E_{Rn}(t)=\text{sqrt}[\text{trace}_1(t)^2+\ldots \text{trace}_m(t)^2].$$

In this embodiment, the resultant trace (E$_{Rn}$(t)) for each receiver 101-104 is calculated by calculating a square root of the sum of the square of each trace$_m$(t) received for a respective receiver in a selected time window.

In one example, the resultant trace (E$_{Rn}$(t)) is calculated from the traces trace$_m$(t) generated by a multi-dimensional receiver, such as a receiver that generates traces in three orthogonal dimensions x, y and z. These traces may be represented as trace$_x$(t), trace$_y$(t) and trace$_z$(t). Calculation of the resultant trace (E$_{Rn}$(t)) may be represented by the equation:

$$E_{Rn}(t)=\text{sqrt}[\text{trace}_x(t)^2+\text{trace}_y(t)^2+\text{trace}_z(t)^2].$$

In this equation, trace$_x$ is the trace of a first horizontal axis, trace$_y$(t) is the trace of a second horizontal axis, and trace$_z$(t) is the trace of a vertical axis.

In the second stage 310, the resultant traces (E$_{Rn}$(t)) collected and/or calculated from each receiver (Rn) may be used to compute a virtual trace (E$_{Rvirtual}$(t)). Using multiple trace values, e.g., E$_{R1}$(t), E$_{R2}$(t), E$_{R3}$(t) … E$_{Rn}$(t), the virtual trace (E$_{Rvirtual}$(t)) may be determined.

In one embodiment, the traces (E$_{Rn}$(t)) from the plurality (e.g., a plurality 130) of receivers 101-104 are summed to determine the virtual trace (E$_{Rvirtual}$(t)).

The virtual trace value (E$_{Rvirtual}$(t)) may be calculated from any number of trace values (E$_{Rn}$(t)). Such a calculation may be represented by the equation:

$$E_{Rvirtual}(t)=[E_{R1}(t)+\ldots E_{Rn}(t)]$$

This equation represents a sum of the traces (E$_{Rn}$(t)) from a plurality of receivers (Rn). The plurality includes a first trace from a first receiver, represented by "E$_{R1}$(t)", and additional trace(s) from any number of additional receivers, represented by "E$_{Rn}$(t)". The number of additional traces (E$_{Rn}$(t)) is potentially infinite and limited only by the ability to process and present reliable data.

An example of a calculation of the virtual trace (E$_{Rvirtual}$(t)) is provided. In this example, the virtual trace (E$_{Rvirtual}$(t)) is represented by the equation:

$$E_{Rvirtual}(t)=[E_{R1}(t)+E_{R2}(t)+E_{R3}(t)+E_{R4}(t)]$$

In the embodiment shown in FIG. 1, for example, the trace value computed for each of the receivers 101, 102, 103 and 104 is represented by E$_{R1}$(t), E$_{R2}$(t), E$_{R3}$(t), and E$_{R4}$(t), respectively.

In the third stage 315, a virtual trace value (E$_{Rvirtual}$) may be calculated based on the virtual trace (E$_{Rvirtual}$(t)). The virtual trace value (E$_{Rvirtual}$) may be calculated, for example, by normalizing the values of the traces (E$_{Rn}$(t)) to achieve a scale value, such as a scale value having a maximum of one (1). Normalization may be achieved by a method including, for example, division of the traces (E$_{Rn}$(t)) by the standard deviation.

In one embodiment, the virtual trace value ($E_{Rvirtual}$) may be represented by the equation:

$$(E_{Rvirtual}) = (1/N) * [E_{Rvirtual}(t) dt / [\int E_{R1}(t)dt + \int E_{R2}(t)dt + \int E_{R3}(t)dt + \int E_{R4}(t)dt \ldots + \int E_{Rn}(t)dt]$$

In this equation, N represents the number of receivers or receiver locations (e.g., N=4). The boundary of the integrals in this equation correspond to the boundaries of a selected time window. The boundaries are referred to in the following description as T1 and T2.

The resulting virtual trace value ($E_{Rvirtual}$) may have a value between zero (0) and one (1). Higher values, including values that are close to and approach one (1) may indicate seismically active zones (e.g., zones that emit a lot of noise) and/or seismic events. Virtual trace values ($E_{Rvirtual}$) approaching one (1) may also indicate that the noise or seismic activity is consistent on the traces of each of the real receivers used to calculate the virtual point.

In one embodiment, the boundary of T1 and T2 is equal to the selected time window for each trace. In another embodiment, T1 and T2 are the same for each integral of the equation.

The virtual trace value ($E_{Rvirtual}$) may be calculated for any value of T1 and T2 and may thus show different time scales of the seismic phenomenon observed. Moreover, virtual trace values ($E_{Rvirtual}$) may be calculated for one or more particular periods and may show a time variation for an active zone, for example by an extension of the steam chamber in a particular direction and/or a variation of pressure within the steam chamber.

In the fourth stage 320, a virtual point may be created having a location, and a virtual trace value ($E_{Rvirtual}$) provided by the virtual trace ($E_{Rvirtual}(t)$).

In one embodiment, the resulting virtual trace value is then plotted as a virtual point 135 in the center of the four real receiver points 101-104. This analysis is referred to as CBSF, for "Coherence Bruit Sismique de Fond", translated as "Background Seismic Noise Consistency". The virtual point 135 has a virtual trace value ($E_{Rvirtual}$) determined as described above, and has a virtual trace location based on the locations of each of the receivers 101-104. The virtual point and analysis described herein is merely exemplary. The numbers and configurations of the receivers used in this analysis are not limited.

Multiple virtual traces values may be calculated for various sets of receivers. For example, a virtual point 145 may also be calculated based on the trace values from the plurality 140 of the receivers 105-108. Additional virtual points may also be calculated from any combination of receivers 101-108. That is, each "plurality" is receivers may be selected from any combination of the receivers 101-108. Also, as indicated above, multiple pluralities may share common receivers. In one embodiment, multiple virtual points may be plotted in a graph or other visual display at representative locations. An image may be created showing the different virtual trace values at each virtual point, so that locations of seismic events may be detected.

In the fifth stage 325, seismic events may then be detected among the virtual points by comparing one or more virtual trace values ($E_{Rn}$) to a threshold value. In one embodiment, values in excess of the threshold from several proximate virtual points may indicate an event, whose location may be triangulated from the locations of the virtual points. In another embodiment, the threshold value may also be compared to the trace values ($E_{Rn}$).

In one embodiment, the plurality of receivers form a geometric shape, which may be represented by a shape formed by the locations of each receiver in the plurality. The shape may be one-dimensional, such as a line between two locations, two-dimensional or three dimensional. The virtual point may be located between or amongst the plurality of receivers. In one embodiment, the virtual point is located at a center of the receivers. The "center" may include a geometric center of the shape, also referred to as a "geometric centroid", or a center of gravity of the shape. For example, the center of gravity for the shape may be calculated for an object forming the shape, under the assumption that the object has uniform density throughout. In another example, the center of gravity for the shape may be calculated based on a variable density or velocity model within the object forming the shape.

For example, receivers 101-104, which are described in an exemplary embodiment of the method described above, four traces representing data locations from the four receivers 101-104 forming a square are used, and the resulting virtual point is located in the center, i.e., centroid, of the square formed by the locations of the receivers 101-104. This embodiment may assume a constant velocity model within the area of the four receivers.

Any number of receivers may be used to compose the virtual trace value ($E_{Rvirtual}$) based on the methods described herein. Furthermore, because the virtual trace value ($E_{Rvirtual}$) may be normalized, multiple trace values corresponding to different numbers of receivers may be calculated and compared.

In one embodiment, if a shape formed by the locations of the receivers form an equilateral geometric shape, the virtual point may be located at the center of the shape. In another embodiment, a plurality of receivers forming non-equilateral configurations may be used to calculate a virtual point, but the resulting virtual point location may need to be adjusted to the resulting effective center, such by computing the center of gravity for the shape.

In one embodiment, traces from disparate velocity models may be used, but the resulting location of the virtual point may need to be adjusted to compensate for the variances in the velocity model. Also, variances in the velocity model may cause adjustment to the amplitude and frequency of the real traces prior to their use in the method.

In another embodiment, the methodology described may be nested. That is, several virtual points (e.g., virtual points 135 and 145) may be treated as real traces and combined into a single, super virtual point using the methods described herein. Similarly, overlapping pluralities of real traces may be used, so that a single real trace may participate in the computation of more than one virtual trace.

The methods described herein may be used in a system that operates in real time or near real time in order to provide timely information to personnel at the site of a formation. This information may then be used in order to influence interventions or to provide additional safety measures, as previously described.

Each seismic receiver 101-108 may include supporting equipment, such as a memory system suitable to recording data from events detected by the sensor over a relatively long period of time, a clock suitable for noting the time at which data is received from a receiver, a microprocessor suitable to basic pre-processing or processing of data from the receiver or the memory, as well as other such equipment.

Any memory devices or systems provided may be one of several types. Conventional or hardened hard drives may be used, depending upon the environment where the receiver is to be placed. Random access memory (RAM), including SRAM or DRAM, may be used in order to provide a more compact or more robust package. Read only memories may also be used, such as EPROMs or the like. Further, optical storage may be utilized.

In one embodiment, the methods described herein are embodied in a system including a dense field of receivers, so that several virtual points may be compared to detect variances. Providing a large number of virtual points allows for the provision of a reliable baseline of information from which to determine potential seismic events.

In support of the teachings herein, various analysis components may be used, including digital and/or analog systems. The system may be implemented in software, firmware, hardware or some combination thereof. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the system and methods disclosed herein in any of several manners. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer or processor to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining a seismic event from indications of seismic noise, the method comprising:

receiving seismic trace data responsive to the seismic noise generated within a formation at sensors at a plurality of locations; and using a processor to:

determine a virtual trace from the seismic trace data for a virtual trace location related to the plurality of locations, and determine a virtual trace value ($E_{Rvirtual}$) for the determined virtual trace from normalized values of the seismic trace data and a normalized value of the determined virtual trace, wherein the virtual trace value indicates a presence of the seismic event.

2. The method of claim 1, further comprising determining the virtual trace location by calculating at least one of a geometric center and a center of gravity of a shape formed by the plurality of locations.

3. The method of claim 1, further comprising using the processor to normalize the seismic trace data.

4. The method of claim 1, further comprising:

receiving at least one trace ($trace_m(t)$) from each of the plurality of locations; and calculating a sum of the at least one trace ($trace_m(t)$) for each of the plurality of locations.

5. The method of claim 1, further comprising:

receiving at least one trace ($trace_m(t)$) from the sensors at each of the plurality of locations within a time window; and calculating a resultant trace ($E_{Rn}(t)$) using the equation:

$$E_{Rn}(t) = \text{sqrt}[trace_1(t)^2 + \ldots trace_m(t)^2],$$

"$trace_m(t)$" representing one or more traces received from each of the plurality of locations within the time window.

6. The method of claim 1, further comprising:

receiving seismic trace data from sensors at another plurality of locations;

providing another virtual trace value as seismic event data for another virtual trace location; and comparing the virtual trace value ($E_{Rvirtual}$) and the another virtual trace value to a threshold value to determine a location of the seismic event.

7. The method of claim 1, further comprising:

calculating the virtual trace value ($E_{Rvirtual}$) using the equation:

$$E_{Rvirtual}(t) = [E_{R1}(t) + \ldots E_{Rn}(t)]$$

wherein "$E_{R1}(t) \ldots E_{Rn}(t)$" represents the seismic trace data for each of the plurality of locations.

8. The method of claim 7, further comprising:

calculating the virtual trace value ($E_{Rvirtual}$) using the equation:

$$E_{Rvirtual} = (1/N) * \int E_{Rvirtual}(t)dt / [\int E_{R1}(t)dt + \ldots \int E_{Rn}(t)dt],$$

wherein "N" represents a number of locations in the plurality of locations.

9. The method of claim 8, further comprising determining a threshold value indicative of a seismic event.

10. The method of claim 1, further comprising using the processor to:

compare a threshold value to the virtual trace value ($E_{Rvirtual}$) to determine whether the seismic event has occurred.

* * * * *